3,090,757
ANTIFREEZE COMPOSITION
Bernard H. Berger, Trenton, N.J., assignor to Cities Service Research and Development Company, New York, N.Y., a corporation of New Jersey
No Drawing. Filed Aug. 23, 1960, Ser. No. 51,275
5 Claims. (Cl. 252—75)

This invention relates to an improved antifreeze composition and more particularly relates to an improved antifreeze composition for use in cooling systems in internal combustion engines.

Antifreeze compositions comprising aqueous solutions of water soluble alcohols are commonly employed in the cooling systems of internal combustion engines to prevent freezing of the cooling medium during periods of cold weather. These compositions are used in systems in which they are in contact with different metals and with combinations of metals such as steel, iron, copper, aluminum, etc. Corrosion of metals in the system is frequently aggravated by electrolytic effects caused by contacting the antifreeze composition with the various metals used in the system. The presence of various metals in the system also complicates the problem of finding a suitable antifreeze composition since agents which are effective to inhibit corrosion of particular metals are frequently corrosive to other metals. Since antifreeze compositions must be formulated for use with systems containing different metals it is, therefore, frequently necessary to employ various inhibitors in the antifreeze compositions. The problem is further complicated by the fact that the presence of one corrosion inhibitor may adversely affect the performance of other corrosion inhibitors in the same solution. It is, therefore, a matter of some importance to formulate antifreeze solutions containing the correct combinations of ingredients to insure proper protection against corrosion of the various metals commonly found in cooling systems.

With the increasing use of aluminum parts in internal combustion engines and especially in automobile engines, one of the most urgent problems facing suppliers and users of antifreeze at the present time is the need for antifreeze compositions which can be used in contact with aluminum as well as with other metals such as steel, cast iron, etc. Unfortunately, previously available antifreeze compositions are strongly corrosive with respect to aluminium.

Since most antifreeze solutions are distributed in concentrated form and diluted with water only when placed into actual use in the cooling system of an internal combustion engine, the effects of the antifreeze solution on metal storage containers must also be considered. Unfortunately, many antifreeze solutions which provide adequate protection against corrosion when diluted with water do not provide sufficient protection against corrosion of metal containers during storage in concentrated form. This breakdown of the antifreeze composition during storage is especially noticeable in the case of ethylene glycol antifreezes.

It is an object of this invention to provide an antifreeze composition which has improved resistance to corrosion of various metals during storage prior to use as well as when used in aqueous solutions in cooling systems.

It is another object of the present invention to provide an improved antifreeze composition having improved resistance to corrosion of aluminum.

In accordance with a preferred embodiment of the present invention, an antifreeze composition is provided the non-aqueous portion of which consists essentially of a water soluble alcohol selected from the group consisting of low molecular weight monohydroxy aliphatic alcohols and low molecular weight dihydroxy aliphatic alcohols and which contains minor proportions of an alkali metal arsenite, an alkali metal mercaptobenzothiazole, an alkali metal metaborate and an alkyl ammonium phosphate having the formula

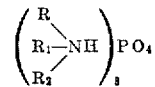

wherein R, $R_1$ and $R_2$ are each selected from the group consisting of hydrogen and alkyl hydrocarbon radicals having from one to about 6 carbon atoms and at least one of R, $R_1$ and $R_2$ is an alkyl hydrocarbon radical having from one to about 6 carbon atoms.

Alcohols suitable for use in antifreeze compositions of the present invention include monohydroxy and dihydroxy aliphatic alcohols of low molecular weight and are preferably present in amounts between about 90 and about 99 weight percent of the total antifreeze composition. Suitable monohydroxy alcohols preferably contain 1 to 6 carbon atoms and include, for example methanol, ethanol, propanol, etc., while suitable dihydroxy alcohols preferably contain 2 to 6 carbon atoms and include, for instance, ethylene glycol or propylene glycol. Mixtures of suitable monohydroxy alcohols or dihydroxy alcohols may also be used. Monohydroxy alcohols are commonly used in the preparation of volatile antifreeze compositions while dihydroxy alcohols are commonly used in the preparation of non-volatile or permanent type antifreeze compositions. While a variety of alcohols are suitable for use in antifreeze compositions of the present invention as described above, ethylene glycol is preferred for use in non-volatile type antifreeze compositions while methanol is preferred for use in volatile type antifreeze compositions.

The antifreeze compositions described herein are concentrated compositions containing only a minimum amount of water or other diluent and it is contemplated that such compositions will usually be diluted prior to use. While the antifreeze compositions of the present invention are intended primarily for use in the cooling system of internal combustion engines, they may be utilized in a number of different fields in which dilute solutions are used under conditions where temperatures may range below the freezing point of the diluent. When used in cooling systems, the antifreeze compositions described herein are usually diluted with water to obtain a solution containing between about 10 and about 70 volume percent of the antifreeze composition, but solutions containing other proportions of the antifreeze compositions are within the scope of the invention.

The alkyl ammonium phosphate of the present invention is preferably present in the antifreeze composition of the invention in amounts between about 0.2 and about 2.0 weight percent of the total antifreeze composition. Primary, secondary or tertiary alkyl ammonium phosphates are suitable for this purpose and, where more than one alkyl group is present, these groups may be the same or mixed. While any alkyl groups which are readily soluble in the antifreeze composition may be present in the alkyl ammonium phosphate, the alkyl groups present in this compound preferably contain between 1 and 6 carbon atoms. A preferred alkyl ammonium phosphate for use in antifreeze compositions of the present invention is triethylammonium phosphate having the formula: $((C_2H_5)_3NH)_3PO_4$ but other suitable alkyl ammonium phosphates may be used and may include, for example: methylpropylbutylammonium phosphate having the formula

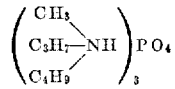

diethylammonium phosphate having the formula $((C_2H_5)_2NH_2)_3PO_4$ hexylammonium phosphate having the formula $(C_6H_{13}-NH_3)_3PO_4$ ethylpentylammonium phosphate having the formula

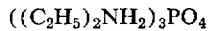

and diethylbutylammonium phosphate having the formula

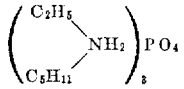

In addition to the alkyl ammonium phosphates described above, antifreeze compositions of the present invention include alkali metal arsenite, alkali metal mercaptobenzothiazole and alkali metal metaborates.

The alkali metal arsenite present in antifreeze compositions of the invention is preferably present in amounts between about 0.2 and about 1.0 weight percent of the total antifreeze composition, and may conveniently be added to the composition as an aqueous solution of suitable strength such as about 50% aqueous solution. Sodium arsenite is preferred for this purpose, but other alkali metal arsenites such as potassium arsenite are also suitable. Likewise, a preferred alkali metal mercaptobenzothiazole for use in antifreeze compositions of the present invention is sodium mercaptobenzothiazole while other alkali metal mercaptobenzothiazoles, such as potassium mercaptobenzothiazole, may be used. The alkali metal mercaptobenzothiazole salt is preferably present in amounts between about 0.1 and about 0.6 weight percent of the total antifreeze composition and may conveniently be added to the composition as an aqueous solution of suitable strength such as, for example, a 50 weight percent solution.

Sodium metaborate is a preferred alkali metal metaborate for use in the present invention although other alkali metal metaborates such as potassium metaborate may be used. The alkali metal metaborate is preferably present in the antifreeze compositions of the invention in amounts between about 0.2 and about 2.0 weight percent of the total antifreeze composition based on the alkali metal metaborate. Alkali metal metaborate is conveniently supplied together with small amounts of water which may be present as water of hydration such as four moles or eight moles of water per mole of alkali metal metaborate.

It has been found quite unexpectedly, not only that antifreeze compositions of the type described above provide good protection against corrosion, but also that such compositions which contain alkali metal arsenite, alkali metal mercaptobenzothiazole, alkali metal metaborate and alkyl ammonium phosphate are far more resistant to corrosion than compositions which contain some but not all of these ingredients. This unexpected superiority of the above described antifreeze compositions in resisting corrosion of various metals is clearly demonstrated by the data presented below.

The ingredients incorporated in anti-freeze compositions of the present invention may be mixed in any suitable manner. For instance, normally solid ingredients may be dissolved directly in all or a portion of the liquid components of the composition. Normally solid ingredients may also be dissolved in small amounts of suitable solvents such as water or alcohol and the resulting solutions may be used in formulating the antifreeze compositions.

Since the usual commercial practice is to distribute antifreeze compositions in concentrated form for dilution with water immediately prior to use, it is usually desirable to use as little water or other solvent or diluent as possible in formulating antifreeze compositions since additional diluent merely increases the quantity of solution which must be transported and stored prior to use. It is frequently desirable, however, to use small amounts of water to aid in mixing the various ingredients of the above described antifreeze compositions. Also, small amounts of water are frequently present in commercial alcohols such as ethylene glycol. Water is, therefore, frequently present in antifreeze compositions of the present invention in quantities between about 1.0 and about 10.0 weight percent of the antifreeze composition and larger amounts of water may, of course, be present after such composition has been diluted for use of if such composition is deliberately prepared with additional water.

In addition to the ingredients described above, antifreeze compositions of the present invention may include small amounts of other ingredients such as antifoam agents, dyes for imparting desired color properties or other special purpose additives. Suitable antifoam agents may include, for example, commercial silicon emulsions as well as polyglycol antifoam agents. A suitable polyglycol antifoam agent is, for instance, a polypropylene glycol having a molecular weight of about 1200. Both silicon and polyglycol antifoam agents may be used separately or together in suitable amounts. For instance, where a silicon antifoam is used, it is frequently present in amounts between about 0.001 and about 0.01 weight percent of the antifreeze composition while polyglycol antifoam agents when used are frequently present in amounts between about 0.05 and about 0.2 weight percent of the total antifreeze composition. If special color properties are desired in the finished antifreeze composition, suitable color dyes may be used and such dyes are frequently present in amounts between about 0.0005 and about 0.005 weight percent of the antifreeze composition.

Many various antifreeze compositions may, of course, be formulated in accordance with the present invention and the compositions described below are merely indicative of the various types of antifreeze compositions contemplated by the invention. The following compositions illustrate by way of example antifreeze compositions which may be formulated in accordance with the invention. In each case the amount of each ingredient is expressed as a weight percent of the total composition.

EXAMPLE 1

A suitable antifreeze composition of the present invention which is effective in resisting corrosion of various metals, especially aluminum, may, for example, contain the following ingredients expressed as weight per cent of the total antifreeze composition exclusive of any additional water or other diluent which may be added at the time of formulation or subsequently.

| Ingredients: | Weight percent |
|---|---|
| Ethylene glycol | 96.567 |
| Water | 2.5 |
| Sodium arsenite | 0.34 |
| Sodium mercaptobenzothiazole | 0.17 |
| Sodium metaborate | 0.48 |
| Triethylammonium phosphate | 0.34 |
| Polyglycol antifoam agent (molecular weight 1200) | 0.1 |
| Ethanol | 0.5 |
| Green dye | 0.003 |

EXAMPLE 2

Another suitable antifreeze composition may contain the following ingredients.

| Ingredients: | Weight percent |
|---|---|
| Propylene glycol | 93.7 |
| Water | 2.0 |
| Sodium arsenite | 1.0 |
| Sodium mercaptobenzothiazole | 0.3 |
| Sodium metaborate | 2.0 |
| Triethylammonium phosphate | 1.0 |

EXAMPLE 3

Another suitable antifreeze composition in accordance with the invention includes the following ingredients.

| Ingredients: | Weight percent |
|---|---|
| Methanol | 93.5 |
| Water | 3.5 |
| Sodium arsenite | 0.2 |
| Sodium mercaptobenzothiazole | 0.6 |
| Sodium metaborate | 0.2 |
| Triethylammonium phosphate | 2.0 |

EXAMPLE 4

Still another suitable antifreeze composition in accordance with the invention comprises the following ingredients.

| Ingredients: | Weight percent |
|---|---|
| Ethanol | 97.6 |
| Potassium arsenite | 0.6 |
| Potassium mercaptobenzothiazole | 0.3 |
| Potassium metaborate | 1.0 |
| Triethylammonium phosphate | 0.5 |

EXAMPLE 5

Another suitable antifreeze composition in accordance with the invention contains the following ingredients.

| Ingredients: | Weight percent |
|---|---|
| Ethylene glycol | 98.45 |
| Sodium arsenite | 0.15 |
| Sodium mercaptobenzothiazole | 0.1 |
| Sodium metaborate | 0.8 |
| Methylpropylbutylammonium phosphate | 0.5 |

EXAMPLE 6

Still another suitable antifreeze composition in accordance with the invention contains the following ingredients.

| Ingredients: | Weight percent |
|---|---|
| Ethylene glycol | 96.3 |
| Water | 1.0 |
| Sodium arsenite | 0.1 |
| Sodium mercaptobenzothiazole | 0.4 |
| Sodium metaborate | 1.5 |
| Diethylammonium phosphate | 0.7 |

EXAMPLE 7

Another suitable antifreeze composition in accordance with the invention includes the following ingredients.

| Ingredients: | Weight percent |
|---|---|
| Ethylene glycol | 90.2 |
| Water | 5.0 |
| Sodium arsenite | 0.2 |
| Sodium mercaptobenzothiazole | 0.2 |
| Sodium metaborate | 1.8 |
| Hexylammonium phosphate | 1.0 |

EXAMPLE 8

In order to test the effectiveness of antifreeze compositions of the present invention in resisting corrosion of various types of metals, the antifreeze composition described in Example 1 above was formulated and tested as indicated below. This antifreeze composition is identified below as composition A. In the preparation of composition A, a mixing tank was filled with the desired amount of ethylene glycol and sufficient water was added to bring about the desired amount of water in the finished antifreeze composition. After the ethylene glycol and water were mixed thoroughly, a sufficient amount of a 43% aqueous solution of sodium arsenite was added by mixing thoroughly to yield the desired amount of sodium arsenite in the finished composition. Following this a sufficient amount of a 50% aqueous solution of sodium mercaptobenzothiazole was added to yield the desired amount of sodium mercaptobenzothiazole in the finished composition. Similarly, a sufficient amount of eight mole sodium metaborate was mixed thoroughly with the previous ingredients to provide the desired amount of sodium metaborate in the finished composition and a sufficient amount of a 40% ethanol solution of triethylammonium phosphate was mixed with the previous ingredients to provide the desired amount of triethylammonium phosphate in the finished antifreeze composition. Following these mixing operations appropriate amounts of polyglycol antifoam agent and green dye were added.

In order to more fully evaluate the antifreeze composition A described above, additional antifreeze compositions designated B and C were prepared containing the following ingredients expressed as weight percent of the total compositions as shown in Table 1. It will be noted from Table I that the only difference between antifreeze compositions A and B was the presence of an alcohol solution of triethylammonium phosphate in composition A and its absence in composition B. Composition C, on the other hand, contained triethylammonium phosphate but did not contain any sodium arsenite, sodium mercaptobenzothiazole or sodium metaborate.

*Table I*

ANTIFREEZE COMPOSITIONS

| Ingredient | Weight percent | | |
|---|---|---|---|
| | A | B | C |
| Ethylene glycol | 96.567 | 96.407 | 97.63 |
| Water | 2.5 | 2.5 | 1.4 |
| Sodium Arsenite | 0.34 | 0.34 | |
| Sodium Mercaptobenzothiazole | 0.17 | 0.17 | |
| Sodium Metaborate | 0.48 | 0.48 | |
| Triethylammonium Phosphate | 0.34 | | 0.34 |
| Polyglycol Antifoam Agent | 0.1 | 0.1 | 0.1 |
| Green Dye | 0.003 | 0.003 | 0.003 |
| Ethanol | 0.5 | | 0.5 |

The corrosion effects of antifreeze compositions A, B and C described above were tested with respect to steel, copper, brass, solder, cast aluminum and cast iron by the use of the ASTM glassware corrosion test D-1384 as modified by General Motors Specification 1899-M. In this test, 1 by 2 inch specimens of the various metals used are uniformly cleaned, polished, weighed and bolted together on an insulated rod with ¼ inch spacers between the specimens. The spacers are made from one of the two adjoining metal specimens except that a nonconducting material is used between brass and steel. The cast iron, cast aluminum and solder specimens are ⅛ inch thick while the steel, copper and brass specimens are 1/16 inch thick. The steel specimen is SAE 1020 cold rolled steel. The specimen bundle is placed in a 1 liter tall form beaker with 250 milliliters of the antifreeze composition being tested and 750 milliliters of synthetic hard water standardized to contain 300 parts per million (p.p.m.) of sulfate ion and 100 p.p.m. chloride ion (sodium salt in both cases). The beaker is fitted with a gas dispersion tube which extends to the bottom of the beaker. The solution is maintained at 160° F. and the aeration rate is set at 100 milliliters per minute. After 336 hours the specimens are removed from the solution, examined visually, cleaned free of corrosion products, dried and weighed. Corrosion losses are reported as milligrams per specimen. The results of this glassware corrosion test of the antifreeze compositions A, B and C are shown in Table II.

*Table II*

GLASSWARE CORROSION TEST RESULTS

| Weight loss per Specimen (mg.) | Antifreeze Composition | | |
|---|---|---|---|
| | A | B | C |
| Copper | 6.9 | 7.6 | 10.3 |
| Brass | 5.8 | 5.1 | 12.7 |
| Solder | 6.6 | 4.6 | 235.3 |
| Cast Aluminum Preclean [a] | −0.4 | 25.6 | 18.6 |
| Cast Aluminum Postclean [b] | 2.0 | 35.3 | 27.7 |
| Steel | 1.3 | 1.4 | 191.2 |
| Cast Iron | 1.5 | 1.6 | 285.2 |
| Total weight loss (mg.) | 24.1 | 81.2 | 781.0 |

[a] Wiped clean with acetone.
[b] Immersed in 5% phosphoric acid and 2% chromic acid for 5 minutes at 175° F.

The results shown in Table II above indicate very clearly that the antifreeze composition A, which contained alkyl ammonium phosphate, as well as alkali metal arsenite, alkali metal metaborate and alkali metal mercaptobenzothiazole, provided vastly superior corrosion resistance than did the antifreeze compositions B and C which did not contain all of these ingredients. The superiority of the antifreeze composition containing all of these ingredients is especially evident with respect to corrosion of aluminum. It will be noted from Table II that while antifreeze compositions B and C corroded the aluminum specimens quite badly, the antifreeze composition A substantially eliminated such corrosion of the aluminum specimens. This almost complete lack of corrosion on the aluminum specimens is entirely unexpected and is especially important in view of the fact that the major defect of previous commercial antifreezes has been their almost total ineffectiveness in protecting against corrosion of aluminum. With an increasing number of aluminum parts being used in internal combustion engines and with automobile engines having aluminum engine blocks becoming more and more prevalent, it is extremely important that an antifreeze solution provide satisfactory protection against corrosion of the aluminum parts of the engine. It is apparent from Table II that antifreeze compositions such as A, containing alkyl ammonium phosphate, as well as alkali metal arsenite, alkali metal metaborate and alkali metal mercaptobenzothiazole, are capable of providing such protection.

Table II also shows conclusively that the superior properties of the composition A noted above were not due merely to the addition of alkyl ammonium phosphate to the ingredients used in composition B. The ineffectiveness of the alkyl ammonium phosphate used alone is apparent from the high corrosion losses caused by composition C. The low corrosion losses caused by composition A, especially with respect to aluminum were, therefore, completely unexpected and must be assumed to be the result of some unforseeable cooperation between the alkali metal arsenite, alkali metal metaborate, alkali metal mercaptobenzothiazole and alkyl ammonium phosphate contained in antifreezes of the present invention.

To further test the effectiveness of the antifreeze compositions of the present invention in comparison with other antifreeze compositions, several commercial antifreezes obtained on the open market and designated below as antifreeze compositions D, E, F and G were also subjected to the glassware corrosion test described above. The results of these parts are shown in Table III below.

*Table III*

GLASSWARE CORROSION TEST RESULTS FOR COMMERCIAL ANTIFREEZES

| Weight loss per Specimen (mg.) | Antifreeze Composition | | | |
|---|---|---|---|---|
| | D | E | F | G |
| Copper | 13.3 | 7.5 | | 12.2 |
| Brass | 16.4 | 8.2 | 25.5 | 54.1 |
| Solder | 21.5 | 13.3 | 57.2 | 9.5 |
| Cast aluminum preclean [a] | 6.2 | 15.4 | 7.7 | 10.5 |
| Cast aluminum postclean [b] | 45.7 | 88.5 | 41.4 | 39.5 |
| Steel | 10.0 | 2.5 | 497.2 | 165.4 |
| Cast Iron | 116.0 | 0.4 | 258.5 | 106.8 |
| Total weight loss (mg.) | 229.1 | 135.8 | 887.5 | 398.0 |

[a] Wiped clean with acetone.
[b] Immersed in 5% phosphoric acid and 2% chromic acid for 5 minutes at 175° F.

Table III demonstrates quite clearly that none of the commercial antifreezes tested were nearly as satisfactory in resisting corrosion as were the antifreezes of the present invention containing alkyl ammonium phosphate. Not only were most of the commercial antifreezes ineffective in controlling corrosion of iron and steel, but all of the commercial antifreezes tested, especially the one antifreeze (E) which was effective in resisting corrosion of steel and iron, were almost completely ineffective in protecting the aluminum specimens and allowed the aluminum specimens to be corroded in an extremely unsatisfactory manner. It is thus apparent that the antifreeze compositions of the present invention containing alkyl ammonium phosphate, alkali metal arsenite, alkali metal mercaptobenzothiazole and alkali metal metaborate are not only superior to similar antifreezes which do not contain the alkyl ammonium phosphate, but are vastly superior to commercially available antifreeze compositions.

While the invention has been described above with respect to certain preferred embodiments thereof, it will be understood by those skilled in art that various changes and modifications may be made without departing from the spirit and scope of the invention and it is intended to cover all such changes and modifications in the appended claims.

I claim:

1. An antifreeze composition, which consists essentially of water soluble alcohol selected from the group consisting of monohydroxy aliphatic alcohols having from 1 to 6 carbon atoms and dihydroxy aliphatic alcohols having between 2 and 6 carbon atoms and which contains between about 0.1 and about 0.6 weight percent alkali metal mercaptobenzothiazole, between about 0.2 and about 1.0 weight percent alkali metal arsenite, between about 0.2 and about 2.0 weight percent alkali metal metaborate, and between about 0.2 and about 2.0 weight percent of an alkyl ammonium phosphate having the formula

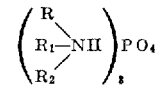

wherein R, $R_1$ and $R_2$ are each selected from the group consisting of hydrogen and alkyl hydrocarbon radiacls having between 1 and 6 carbon atoms and at least one of R, $R_1$ and $R_2$ is an alkyl hydrocarbon radical having between 1 and 6 carbon atoms.

2. A non-volatile type antifreeze composition which consists essentially of ethylene glycol and which contains between about 1 and about 10 weight percent water, between about 0.2 and about 1.0 weight percent alkali metal arsenite, between about 0.1 and about 0.6 weight percent alkali metal mercaptobenzothiazole, between about 0.2 and about 2.0 weight percent alkali metal metaborate, between about 0.05 and about 0.2 weight percent polyglycol antifoam agent, and between about 0.2 and about 2.0 weight percent of an alkyl ammonium phosphate having the formula

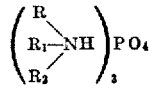

wherein R, $R_1$ and $R_2$ are each selected from the group consisting of hydrogen and alkayl hydrocarbon radicals having between 1 and 6 carbon atoms and at least one of R, $R_1$ and $R_2$ is an alkyl hydrocarbon radical having between 1 and 6 carbon atoms.

3. A non-volatile type antifreeze composition which consists essentially of ethylene glycol and which contains between about 1 and about 10 weight percent water, between about 0.2 and about 1.0 weight percent sodium arsenite, between about 0.1 and about 0.6 weight percent sodium mercaptobenzothiazole, between about 0.2 and about 2.0 weight percent sodium metaborate, and between about 0.2 and about 2.0 weight percent triethylammonium phosphate.

4. A non-volatile type antifreeze composition, the aqueous portion of which consists essentially of water and the non-aqueous portion of which consists essentially of dihydroxy aliphatic alcohol having between 2 and 6 carbon atoms and which contains between about 0.1 and about 0.6 weight percent alkali metal mercaptobenzothiazole, between about 0.2 and about 1.0 weight percent alkali metal arsenite, between about 0.2 and about 2.0 weight percent alkali metal metaborate, and between about 0.2 and about 2.0 weight percent of an alkyl ammonium phosphate having the formula

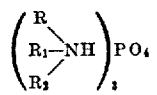

wherein R, $R_1$ and $R_2$ are each selected from the group consisting of hydrogen and alkyl hydrocarbon radicals having between 1 and 6 carbon atoms and at least one of R, $R_1$ and $R_2$ is an alkyl hydrocarbon radical having between 1 and 6 carbon atoms.

5. A non-volatile type antifreeze composition which consists essentially of ethylene glycol and which contains between about 1 and about 10 weight percent water, between about 0.2 and about 1.0 weight percent sodium arsenite, between about 0.1 and about 0.6 weight percent sodium mercaptobenzothiazole, between about 0.2 and about 2.0 weight percent sodium metaborate, between about 0.2 and about 2.0 weight percent triethylammonium phosphate, between about 0.05 and about 0.2 weight percent polyglycol antifoam agent having a molecular weight about 1200, and between about 0.0005 and about 0.005 weight percent of a dye to impart a desired color.

References Cited in the file of this patent

UNITED STATES PATENTS

| | | |
|---|---|---|
| 2,534,030 | Keller | Dec. 12, 1950 |
| 2,769,737 | Russell | Nov. 6, 1956 |
| 2,803,604 | Meighen | Aug. 20, 1957 |
| 2,960,473 | Meighen et al. | Nov. 15, 1960 |

OTHER REFERENCES

Berkeley et al.: "Non-Flammable Paint Strippers," part II, Soap and Chemical Specialties, June 1956, p. 175.

UNITED STATES PATENT OFFICE
CERTIFICATE OF CORRECTION

Patent No. 3,090,757            May 21, 1963

Bernard H. Berger

It is hereby certified that error appears in the above numbered patent requiring correction and that the said Letters Patent should read as corrected below.

Column 3, lines 25 to 30, the formula should appear as shown below instead of as in the patent:

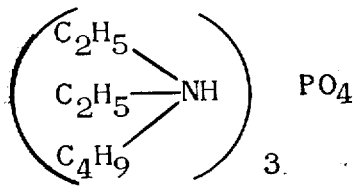

column 6, line 55, for "cororsion" read -- corrosive --; column 8, line 2, for "parts" read -- tests --; column 9, line 13, for "alkayl" read -- alkyl --.

Signed and sealed this 10th day of December 1963.

(SEAL)
Attest:
ERNEST W. SWIDER

Attesting Officer

EDWIN L. REYNOLDS
Acting Commissioner of Patents